Figure 1:
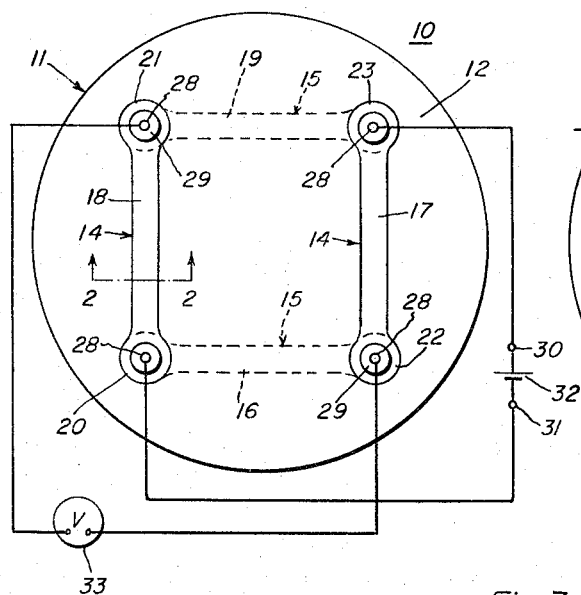

Dec. 13, 1966 R. N. HALL 3,292,128
SEMICONDUCTOR STRAIN SENSITIVE DEVICES
Filed Dec. 26, 1961

Inventor:
Robert N. Hall.
by Joseph V. Claeys
His Attorney.

United States Patent Office 3,292,128
Patented Dec. 13, 1966

3,292,128
SEMICONDUCTOR STRAIN SENSITIVE DEVICES
Robert N. Hall, Schenectady, N.Y., assignor to General
Electric Company, a corporation of New York
Filed Dec. 26, 1961, Ser. No. 161,964
9 Claims. (Cl. 338—2)

This invention relates to semiconductor strain sensitive devices having improved characteristics. More particularly this invention is related to a specific embodiment of the complete bridge-type strain sensitive elements, of the general type disclosed and claimed in the copending application of Gunther E. Fenner, Serial No. 104,271, filed April 20, 1961, now Patent No. 3,251,222, and assigned to the assignee of the present invention, which has improved characteristics. In this respect, therefore, the present invention is an improvement over the invention of the above-identified patent application which invention was made by said Gunther E. Fenner prior to my invention. I, therefore, do not herein claim anything shown or described in the said Fenner application, which is to be regarded as prior art with respect to this present application.

Many problems are presented in suitably applying strain sensitive elements to the strained members for measuring loads. Cements may creep and mechanical linkages may slip or exhibit mechanical hysteresis. Further, in the improved complete bridge-type semiconductor strain sensitive elements of the above referenced Fenner application, the bridge arms should usually be very thin, and the semiconductive material thereof highly impregnated with impurity, in order to obtain a desired electrical impedance and achieve optimum strain sensitive properties. These two latter requirements contribute to the difficulty of obtaining a high impedance, complete bridge unit utilizing heavily impregnated semiconductive material.

It is an object of this invention, therefore, to provide a strain sensitive device which substantially overcomes one or more of the prior art difficulties and which lends itself to achieving greater sensitivity.

It is another object of this invention to provide a strain sensitive device wherein the semiconductor strain sensitive elements are formed of, and within, the strained member itself.

It is a further object of this invention to provide a complete bridge-type semiconductor hydrostatic pressure measuring device wherein two arms of the bridge are loaded in tension while the remaining two arms are loaded in compression.

It is a still further object of this invention to provide a complete bridge-type semiconductor strain sensitive device which allows for greater sensitivity and linear range of response.

Briefly stated, in accordance with one aspect of this invention, an improved semiconductor strain sensitive device comprises a monocrystalline body of high resistivity semiconductive material having a preselected crystallographic orientation. A first pair of low resistivity zones are formed in one surface of the body and a second pair of low resistivity zones are formed in the opposite surface thereof. The low resistivity zones on one surface define the two opposed portions of a four portion closed figure, while the low resistivity zones on the opposite surface define the other two opposed portions thereof. Means are provided for making electrical connections to the respective end portions of the low resistivity zones on opposite surfaces of the body to form therefrom a complete bridge circuit, wherein the arms of each current path are disposed on opposite surfaces of the body and separated from each other by the high resistivity material thereof. The crystallographic orientation of the monocrystalline body and the conductivity-type of the low resistivity zones formed therein, are selected to assure that the longitudinal and transverse elastoresistance coefficients of these zones are related so as to produce a maximum unbalance of the bridge circuit for the applied force. For example, the low resistivity zones may be selected to exhibit longitudinal and transverse elastoresistance coefficients which are either the same or different in polarity, magnitude or both depending upon the particular application of the device and the disposition of the low resistivity zones thereon.

As used throughout the specification and in the appended claims the term "longitudinal" with respect to the elastoresistance coefficient refers to the change in resistivity when current and strain are measured parallel to each other. Similarly, the term "transverse" with respect to the elastoresistance coefficient refers to the change in resistivity when current and strain are measured perpendicular to each other.

Figure 4:
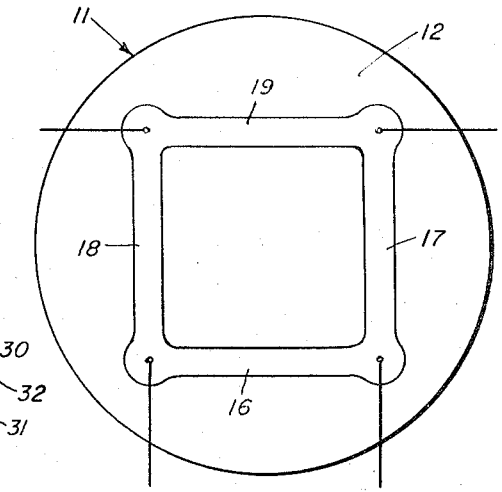
Figure 3:
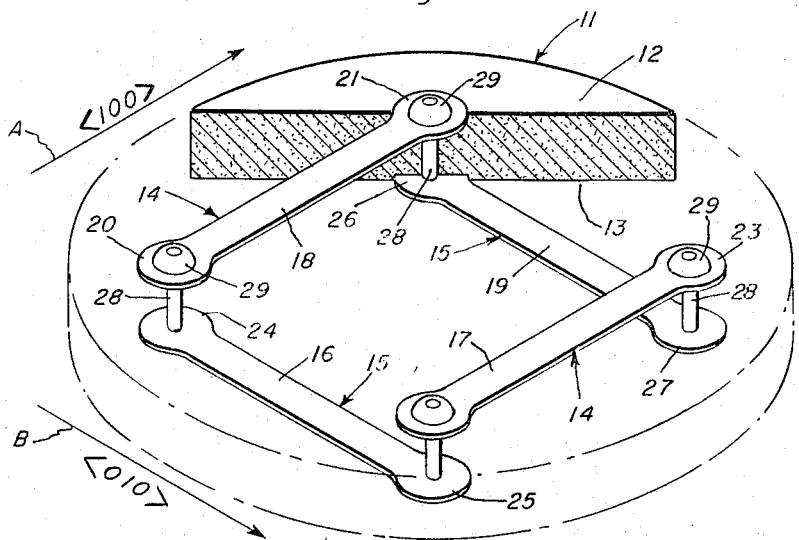
Figure 2:
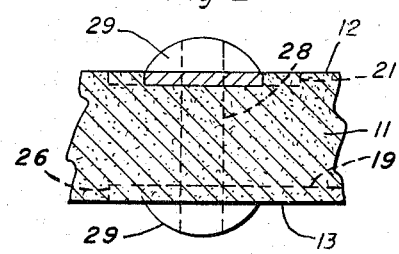

The novel features believed characteristic of this invention are set forth with particularity in the appended claims. My invention itself, however, both as to its organziation and method of operation together with further objects and advantages thereof may best be understood by reference to the following description taken in conjunction with the accompanying drawing in which:

FIGURE 1 is a diagrammatic illustration of a semiconductor strain sensitive device in accordance with one embodiment of this invention, FIGURE 2 is a sectional view along the line 2—2 illustrating a portion of the low resistivity zone as a part of the strained member itself, FIGURE 3 is a perspective view partly in phantom and partly in section illustrating the disposition of the low resistivity conducting zones on opposite surfaces of the strain sensitive device; and FIGURE 4 is a diagrammatic illustration of a semiconductor strain sensitive device in accordance with another embodiment of this invention.

In FIGURE 1 a device 10 embodying the principles of this invention comprises a monocrystalline body 11 of high resistivity, wide band-gap semiconductive material. Body 11 may be composed of silicon, gallium arsenide, aluminum antimonide, or a similar wide band-gap material capable of achieving a wide resistivity range at room temperature. For example, the semiconductive material of body 11 should be capable of achieving a sufficiently high resistivity at room temperature so that the ratio of the resistivity of the high resistivity material to the resistivity of a low resistivity zone established therein is at least $10^4$ and preferably greater than $10^6$. Thus, the band-gap of the semiconductive material must be sufficiently wide that the concentration of intrinsic carriers is not too great to prevent achieving the required high resistivity at room temperature in the body 11, as well as allowing high impurity induced conductivity zones to be established therein.

The body 11 may be in the form of a circular disk, or rectangular plate, and will henceforth be described as high resistivity silicon in the form of a disk having two large-area plane parallel surfaces 12 and 13 respectively. The body 11 is provided with a first pair of low resistivity zones 14, formed in the surface 12, and a second pair of low resistivity zones 15 formed in the opposite surface 13. The zones 14 and 15 are very thin, preferably in the range of about 10–100 microns, and of a resistivity less than about 10 ohm centimeters and preferably in the range of about 0.1 to 0.001 ohm centimeter at room temperature. The pairs of low resistivity zones 14 and 15 are so related, one to the other, that the projection of all zones on to a single plane surface defines a four portion closed figure. The closed figure may have a wide variety of geometric configurations such as, for example, square, rectangular, circular, or the like, provided four portions may be defined thereby. For simplicity of explanation, the closed figure is illustrated in the drawing in the form of a square frame, wherein the pair of low resistivity zones 14 on the surface 12 define two opposed parallel sides, and the pair of low resistivity zones 15, perpendicular to the pair 14 on the opposite surface 13, define the other two opposed parallel sides. Thus, the orthogonally related portions of the closed figure are disposed on opposite surfaces of, and separated by, the high resistivity semiconductive material of the body 11. The four portions of the closed figure are designated by the reference numerals 16, 17, 18 and 19 respectively.

Means are provided for making substantially nonrectifying electrical connections between the respective end portions 20, 21, 22 and 23 of the low resistivity zones 14, and 24, 25, 26 and 27, of the low resistivity zones 15 to form therefrom a complete bridge circuit. To this end, a conductor is passed through the body 11 to contact the ends of the oppositely disposed low resistivity zones. A suitable conductor 28 passes through the body 11 and electrically connects the end 20 of portion 18 to the end 24 of portion 16. Similar connections are provided to the ends 21–26, 22–25 and 23–27 of the opposite low resistivity portions 18–19, 17–16 and 17–19 respectively, to form a complete bridge circuit, as typified in the illustration of FIGURE 2. The conductor 28 may be connected to the ends of the respective low resistivity zones by means of a suitable solder 29 or other means known to the art.

Since as a practical matter it is extremely difficult to obtain a completely nonrectifying connection to semiconductive material, the ends of each of the portions 16 to 19 are provided with an enlargement. These enlarged end portions provide for the recombination of some of the carriers which are injected due to any rectifying properties of the connections between the oppositely disposed ends of the low resistivity portions 16–19 or between the electrode connections thereto during operation, as well as providing for symmetrical current flow in the respective current paths of the bridge unit.

Two ends of the bridge circuit so established may be connected to a suitable voltage source and the other two ends connected to a suitable detecting means. For example, the ends 20 and 23 may be connected to the terminals 30 and 31 of a voltage source, shown schematically as battery 32. The remaining two ends 21 and 22 may be connected to a detecting means 33, such as a galvanometer, voltmeter, or the like. The bridge circuit so provided, therefore, has one resistance arm of each current path disposed on one surface of the monocrystalline body 11 and the other resistance arm thereof disposed on the opposite surface thereof; the two arms being separated by the high resistivity material of the body 11.

To achieve optimum sensitivity from the complete bridge-type strain sensitive device of this invention the resistance in the two portions of the bridge on the one surface should increase while the resistance of the two portions of the bridge on the opposite surface decreases for a given strain. When the device is used as a pressure diaphragm for measuring hydrostatic pressure for example, the low resistivity zones on one surface are loaded in tension and the low resistivity zones on the other surface are loaded in compression. Also in such a device, the predominate strain is such that the change in resistance due to the pressure is determined principally by the longitudinal elastoresistance coefficient of the low resistivity zones making up the bridge unit. The crystallographic orientation of the body 11 of such a device, therefore, and the conductivity type of the respective low resistivity zones are selected to assure that the longitudinal elastoresistance coefficient of these low resistivity zones is large and of the same polarity; the respective increase and decrease in resistance for a given strain being provided by the loading in tension of one pair of zones and the loading in compression of the opposite pair of zones. In addition it is also advantageous in such a pressure diaphragm device to provide that the transverse elastoresistance coefficient has the same polarity as the longitudinal elastoresistance coefficient or else be comparatively small in magnitude.

Alternatively, the pairs of low resistivity zones 14 and 15 may be provided on the same surface of the high resistivity body 11 as shown particularly in FIGURE 4, by suitable selection of crystallographic orientation of the body and conductivity-type of the low resistivity zones formed therein to provide two opposite portions of the closed figure with a large longitudinal elastoresistance coefficient of one polarity and the remaining two opposite portions thereof with a large longitudinal elastoresistance coefficient of opposite polarity. Under this condition, in a pressure measuring device, although all portions of the bridge unit are loaded in the same way, the respective increase and decrease in resistance of the various portions thereof is provided by the opposite polarity longitudinal elastoresistance coefficients.

When the device is to be employed to measure uniaxial strain, optimum sensitivity is achieved by providing that the low resistivity zones exhibit longitudinal and transverse elastoresistance coefficients which are large and of opposite polarity. In this way the change in resistance in one arm of each current path is of opposite polarity to the change in resistance of the other arm of each path thereby providing the desirable increase and decrease in resistance of the respective bridge arms. For example, in such operation the change in resistance of one pair of opposite portions of the closed figure is determined principally by the longitudinal elastoresistance coefficient of the low resistivity material while the change in resistance of the remaining pair of opposite portions of the figure is determined principally by the transverse elastoresistance coefficient. Although it is preferred, therefore, that the longitudinal and transverse elastoresistance coefficients be large and of opposite polarity for such a uniaxial strain measuring device, it will be understood that an extremely sensitive device is provided as long as the longitudinal and transverse coefficients are anisotropic, that is, as long as the coefficients differ from each other in either magnitude, polarity or both. Also, in such a uniaxial strain measuring device, the low resistivity zones forming the bridge-unit may be provided either on the same or opposite surfaces of a very high resistivity monocrystalline body of preselected crystallographic orientation.

The piezoresistance coefficients are usually given for the $<100>$ axis of the crystal, however, it has become well-known in the art that the piezoresistance coefficients may also be readily determined with respect to other crystal rotations. Thus, the piezoresistance coefficients, and hence the related elastoresistance coefficients, may be determined for any given semiconductive material in known manner. Further details of the factors to be considered in making the determinations of the elastoresistance coefficients with respect to the different crystal orientations may be had by reference to vol. 6 of the book entitled "Solid State Physics, Advances in Research and Application," pages 175–249, "Macroscopic Symmetry and Properties of Crystals," published in 1958 by Academic Press, Inc., New York. Still further details about such coefficients may be had by reference to the article entitled "The Piezoresistance Effect and Its Applications" by Lewis E. Hollander et al., published in March 1960, "Review of Scientific Instruments," vol. 31, No. 3, pages 323–327.

An inspection of the piezoresistance coefficients of various semiconductive materials shows that some materials have one large coefficient while others have two large coefficients, and that some coefficients are positive while others are negative. For example, N-type conductivity silicon has a large negative longitudinal coefficient and also a large positive transverse coefficient.

Thus, depending upon the selected orientation of the body and the semiconductive material of which it is composed, the low resistivity zones 14 and 15 may be made either the same or different conductivity-type so as to achieve a large longitudinal elastoresistance coefficient for both pairs of zones, a large longitudinal elastoresistance coefficient for one pair of zones and a large transverse elastoresistance coefficient for the other pair of zones, or a large longitudinal elastoresistance coefficient for one pair of zones and small transverse coefficient for the other pair. Depending both upon the application of the device and the disposition of the low resistivity zones therein, the crystallographic orientation of the body and the conductivity-type of the low resistivity zones formed therein are selected to provide longitudinal coefficients which have the appropriate polarities and magnitude to produce maximum unbalance for an applied force. When these pairs of zones are on opposite sides of the body 11 with one pair loaded in tension while the other is loaded in compression, as in the pressure measuring device, there is freedom to choose an orientation and conductivity-type which gives the greatest sensitivity and linear range of response for the device.

For example, in the drawing the high resistivity silicon body 11 is shown having an orientation along the <100> direction as indicated by the arrow A. Since N-type conductivity silicon exhibits large and opposite polarity longitudinal and transverse elastoresistance coefficients, the two pairs of zones 14 and 15 may be suitably impregnated with an impurity material to render them of N-type conductivity and of a resistivity at room temperature less than about 10 ohm centimeters. The low resistivity zones 14 and 15 will then exhibit the desired large longitudinal elastoresistance coefficients of one polarity, and at the same time large transverse elastoresistance coefficients of opposite polarity, so that the device may be conveniently employed as either a pressure or uniaxial strain measuring device.

To obtain balance for the bridge circuit, the ratio of the resistances of the two low resistivity portions, defining one current path, should be equal to the ratio of the resistances of the two low resistivity portions which define the other current path. For example, the following relationship should be satisfied:

$$R_{16}/R_{17}=R_{18}/R_{19}$$

where the terms $R_{16}$, $R_{17}$, $R_{18}$, and $R_{19}$ refer respectively to the resistance values of the four resistance portions 16–19 of the low resistivity closed figure forming the complete bridge circuit. This may be conveniently provided by making all four portions 16–19 of substantially equal dimensions and resistivity, such as by establishing a uniform low resistivity closed figure having a square or circular configuration, for example. It will be understood, however, that the dimensions and resistivity of the respective portions 16–19 may be different, and the above relationship satisfied, utilizing a wide variety of closed figure configurations.

It will be apparent from the above relationship and the foregoing detailed description that greatest unbalance of the bridge is achieved when the change in resistance in the portions 16 and 19 is large and opposite to the change in resistance in the portions 17 and 18. For example, a maximum detector output for a given stress results when the portions 16 and 19 show a large increase in resistance while simultaneously the portions 17 and 18 show a large decrease in resistance or vice versa.

This condition is fully satisfied in the silicon strain sensitive device shown in the drawing with an orientation of body 11 in the <100> direction, and low resistivity zones 14 and 15 rendered of N-type conductivity. For example, the portion 17 and 18 may be disposed parallel to the <100> axis while the portions 16 and 19 may be disposed parallel with the <010> axis, as shown particularly in FIGURE 3. Thus, since the transverse elastoresistance coefficient of N-type silicon in the <100> direction is large and positive, there is an increase in resistance in the portions 16 and 19 for a uniaxial strain in a direction parallel to the <100> direction. Similarly, the longitudinal coefficient of the N-type conductivity silicon in the <100> direction is large and negative, resulting in a decrease in resistance in the portions 17 and 18 for such a uniaxial strain. In like manner, for a pressure measuring device, the change in resistance is determined principally by the longitudinal elastoresistance coefficient for both pairs of low resistivity zones 14 and 15 with the desired opposite polarity of this change being provided by the compression and tension loading of the zones respectively. The resulting unbalance of the bridge circuit as a result of either hydrostatic pressure or a uniaxial stress may be detected by the detecting means 33 in a well-known manner.

The improved semiconductor strain sensitive device 10 is fabricated in the following general manner.

A high purity, wide band-gap monocrystalline body or wafer, such as of silicon, gallium arsenide, or the like, is provided having a preselected crystallographic orientation. The size and thickness of the body are determined by the magnitude of the load to be measured by the device and the sensitivity desired. The body is converted to high resistivity by diffusing thereinto a deep-level impurity such as copper or gold to provide a resistivity therefor of greater than about 10,000 ohm centimeters. Two opposite portions of a four portion closed figure are converted to low resistivity on one surface of the body, as by mask-diffusing a conductivity determining impurity thereinto. The other two opposed portions of the closed figure are converted to low resistivity on the opposite surface of the body in similar manner. The concentration of impurity should be sufficient to provide these portions with a resistivity less than about 10 ohm centimeters. Further, the conductivity determining impurity is selected to render the low resistivity portions on both surfaces of the body, for the preselected orientation, of a conductivity-type which exhibits a longitudinal elastoresistance coefficient which is large and of one polarity. Preferably, the transverse coefficient is provided with the same polarity as the longitudinal coefficient, for a pressure device, and with opposite polarity for a uniaxial force measuring device. For example, for a silicon body having an orientation in the <100> direction this latter condition is satisfied by indiffusing a donor impurity, such as phosphorous into selected surface adjacent portions thereby rendering these portions of N-type conductivity and low resistivity since both the longitudinal and transverse elastoresistance coefficients of N-type silicon are large and are of opposite polarity.

The ends of the oppositely disposed low resistivity portions are electrically connected together to form a complete bridge circuit therefrom. Small holes are drilled through the ends of the low resistivity portions on one surface of the body, through the semiconductive material of the body itself, and through the ends of the low resistivity portions of the opposite surface of the body. A metal is suitably evaporated over the ends of the respective low resistivity portions on the opposite surfaces of the body and conductors, such as metal wires or the like, passed through the holes and suitably connected, as by soldering, onto the metallized ends of the low resistivity portions. Required balancing of the bridge unit so formed is provided by removing some of the low resistivity material from one or more portions thereof such as by etching or the like. Preferably, such removal may be provided by an electrolytic etching treatment since such treatment is conveniently controllable.

The following specific examples are given by way of illustration.

Example I

A monocrystalline disk of silicon having a diameter of about ¾ inch and a thickness of about ⅛ inch is cut from a silicon body having unremoved impurities in an amount less than about $10^{13}$ atoms per cubic centimeter. The disk is cut from the parent crystal so as to have a crystallographic orientation in the $<100>$ direction. A layer of gold of about 0.1 micron thick, is evaporated on both surfaces of the disk and the disk thereafter heated to a temperature of about 1200° C. for about 50 hours to cause the gold to be diffused thereinto to provide the semiconductive material thereof with a resistivity greater than about $10^4$ ohm centimeters. For example, after heating at 1200° C. for 50 hours the resistivity of the disk is about $10^5$ ohm centimeters.

The entire surface of the disk is then caused to be oxidized such as by heating in an oxidizing atmosphere for about two hours at 1100° C. Selected portions on opposite surfaces of the disk are then unmasked by etching away the oxide coating. The selected etched portions are in the shape of two parallel, spaced-apart strips, each ⅜ inch long and 1/16 inch wide having enlarged ends on one surface, and two similarly shaped and dimensioned spaced-apart parallel strips on the opposite surface of the disk. The respective pairs of strips are orthogonally related to each other so as to form between them a generally square frame-like figure; each of the strips of the figure having a generally dumbbell configuration due to the enlarged end portions.

The disk is then heated in the presence of phosphorous to a temperature of about 1200° C. for four days, to diffuse the phosphorous into the surface adjacent regions of the unmasked portions, rendering them of N-type conductivity and with a resistivity of about 0.01 ohm centimeter and a thickness of about 15 microns. Holes are then drilled through the enlarged ends of the low resistivity strips, a layer of gold is evaporated onto the enlarged ends of the strips, and thereafter a metal wire passed through the holes and soldered into the holes and onto the enlarged metallized ends of the strips to form a complete bridge-type strain measuring device.

Example II

A monocrystalline disk of silicon, having a diameter of about ¾ inch and a thickness of about ⅛ inch, is cut from a monocrystalline body of silicon having unremoved impurities in an amount no greater than $10^{13}$ atoms per cubic centimeter. The disk is cut from the silicon body so as to have a crystallographic orientation in the $<100>$ direction.

The entire surface of the disk is then oxidized by heating in an oxygen or air atmosphere for about two hours at a temperature of about 1100° C. Selected portions of this oxide coating are then etched away. The selected portions are in the form of two spaced-apart parallel strips having enlarged end portions on one broad surface of the disk which lie parallel with the $<100>$ direction of the crystal, and two similarly shaped, parallel, spaced-apart strips on the opposite broad surface of the disk which lie parallel with the $<010>$ direction of the crystal. The unmasked strips are thus orthogonally related to each other and so positioned as to form between them a square frame-like figure; each of the strips of the figure having a generally "dumbbell" configuration due to the enlarged end portions.

Four small holes about 1/64 inch in diameter are drilled through the disk and through the enlarged end portions of the strips. The disk is thereafter heated in the presence of phosphorous for about four days at a temperature of about 1200° C. to render the regions not protected by the oxidized coating of N-type conductivity and a resistivity of about 0.01 ohm centimeter to a thickness of about 15 microns.

The remaining oxide coating is then removed by etching and a layer of gold about 0.1 micron thick is evaporated over both sides of the disk. The disk is then heated for about 50 hours at a temperature of about 1200° C. to diffuse the gold into the disk. After heating for about 50 hours the resistivity of the disk with the exception of the low resistivity phosphorous diffused strips is about $10^5$ ohm centimeters. The entire disk, therefore, with the exception of the narrow strips forming the low resistivity square frame figure, exhibits a very high resistivity.

Nickel is thereafter evaporated onto the enlarged ends of each of the low resistivity N-type conductivity strips, metal wires passed through the small holes, and the wires soldered into the holes and onto the enlarged and metallized ends of the strips to form therefrom a complete bridge circuit. The bridge circuit so formed is balanced by electrolytically etching one of the arms.

There has been described hereinbefore a strain sensitive device of the semiconductor complete bridge-type having improved characteristics. The piezoresistance elements which make up the bridge unit are formed within the strained member itself, thus avoiding the requirement of using cement or other bonding material. Since in one embodiment two arms of the bridge unit are loaded in tension while the other two are loaded in compression, there is great freedom to choose the orientation of the member which gives the greatest sensitivity and linear range of response. Further, the low resistivity zones which define the complete bridge unit may be made very thin so that they may be heavily impregnated with impurity, to achieve optimum piezoresistance effects and temperature stability, and yet yield a high impedance bridge unit.

While this invention has been described with respect to particular embodiment and specific examples thereof by way of illustration, many modifications and changes will occur to those skilled in the art. It is, therefore, to be understood that the appended claims are intended to cover all such modifications and changes as fall within the true spirit and scope of this invention.

What I claim as new and desire to secure by Letters Patent of the United States is:

1. A semiconductor strain sensitive device comprising: a monocrystalline body of high resistivity semiconductive material having a first pair of low resistivity zones in the surface adjacent region of one face and a second pair of low resistivity zones in the surface adjacent region of the opposite face, said first pair of low resistivity zones on one face defining two opposite portions of a four portion closed figure and the second pair of low resistivity zones on the opposite face defining the other two opposite portions of said closed figure, the high resistance of said body providing electrical isolation of said zones in said body; means for making electrical connections to the respective end portions of the low resistivity zones on opposite faces of said body to form a complete unitary bridge circuit, the crystallographic orientation of the monocrystalline body and the impurity concentration and conductivity-type of the low resistivity zones established therein being selected to provide said first and second pairs of low resistivity zones with elastoresistance coefficients adapted to provide a maximum unbalance of said bridge circuit for a given applied force.

2. The semiconductor strain sensitive device of claim 1 wherein the resistivity of the monocrystalline body is at least about $10^4$ ohm centimeters and the resistivity of the low resistivity zones formed in the surface adjacent regions thereof is less than about 10 ohm centimeters.

3. The semiconductor strain sensitive device of claim 1 wherein the resistivity of the monocrystalline body is sufficiently high that the ratio of the bulk resistivity of said body to the bulk resistivity of the low resistivity zones formed therein is at least about $10^4$.

4. A semiconductor strain sensitive device comprising: a monocrystalline body of high resistivity semiconductive material having a preselected crystallographic orientation;

a first pair of low resistivity zones in the surface-adjacent region of one face of said body disposed generally parallel with a first crystallographic direction of said body and of a conductivity-type to provide longitudinal and transverse elastoresistance coefficients which are large and of different polarity; a second pair of low resistivity zones in the surface-adjacent region of the opposite face of said body disposed generally perpendicular to the said first crystallographic direction of said body and of conductivity-type to provide large longitudinal and transverse elastoresistance coefficients which have respectively the same polarities as said first pair of zones, said first and second pairs of low resistivity zones being so related that the first pair defines two opposite portions of a four portion closed figure on one face and the second pair defines the other two opposite portions of said closed figure on the opposite face, the high resistance of said body providing electrical isolation of said zones in said body; and means electrically connecting the ends of said zones disposed on opposite faces of said body to form a complete unitary bridge circuit having the configuration of said closed figure.

5. A semiconductor strain sensitive device comprising: a monocrystalline body of high resistivity silicon having a crystallographic orientation in the <100> direction; a first pair of N-type conductivity low resistivity zones in the surface adjacent region of one face of said body disposed generally parallel with the <100> direction of said body; a second pair of N-type conductivity low resistivity zones in the surface adjacent region of the opposite face of said body disposed generally parallel with the <010> direction thereof, the said first and second pairs of N-type conductivity zones having a resistivity less than about 10 ohm centimeters, a thickness in the range of about 10 to 100 microns and exhibiting longitudinal and transverse elastoresistance coefficients which are different, said pairs of zones being so related that the said first pair of zones on one face of said body defines two opposite portions of a four portion closed figure and the second pair of zones on the opposite face defines the other two opposed portions of said closed figure, the high resistance of said body providing electrical isolation of said zones in said body; and means for making electrical connections to the ends of the respective low resistivity zones disposed on opposite faces of said body to form a complete unitary bridge circuit having the configuration of said closed figure.

6. A semiconductor strain sensitive element comprising: a monocrystalline wafer of high resistivity semiconductive material having opposite broad sides; a first pair of spaced apart, parallel, diffused low resistivity strips in the surface adjacent region of one of said broad sides of said wafer; a second pair of spaced apart, parallel diffused low resistivity strips disposed perpendicular to said first pair of low resistivity strips in the surface adjacent region of the opposite broad side of said wafer with the ends of one pair of strips opposite the ends of the other pair, the projection of said second pair of strips on said one side defining a closed figure with the said first pair of strips, the high resistance of said wafer providing electrical isolation of said strips in said wafer, said diffused low resistivity strips having a thickness in the range of about 10 to 100 microns, the crystallographic orientation of said wafer and the impurity concentration and conductivity-type of the respective pairs of low resistivity strips being correlated to provide said pairs of low resistivity strips with longitudinal and transverse elastoresistance coefficients which are related one to the other that maximum bridge unbalance is obtained for an applied force; and nonrectifying electric contact means interconnecting the oppositely disposed ends of said first and second pairs of low resistivity strips.

7. A semiconductor strain sensitive element comprising: a monocrystalline body of high resistivity semiconductive material having first and second pairs of low resistivity zones disposed within opposite faces of said body respectively and so disposed that the projection of all zones onto a single face defines a closed geometric figure having four portions, the high resistance of said body providing electrical isolation of said zones in said body, the crystallographic orientation of the body and the impurity concentration and conductivity-type of the respective low resistivity zones being selected to provide said low resistivity zones with anisotropic elastoresistance coefficients; and means for making electrical connections to appropriate portions of oppositely disposed low resistivity zones to form a complete bridge circuit wherein one resistance arm of each current path thereof is disposed on one face of said body and the other resistance arm of each current path is disposed on the opposite face.

8. The semiconductor strain sensitive device of claim 7 wherein the resistivity of the said monocrystalline body is sufficiently high that the ratio of the bulk resistivity of said body to the bulk resistivity of the low resistivity zones formed therein is at least $10^4$.

9. A semiconductor strain sensitive element comprising: a monocrystalline body of high resistivity semiconductive material having first and second pairs of low resistivity zones disposed within opposite faces of said body respectively and so related that the projection of all zones onto a single face defines a closed geometric figure having four portions, the high resistance of said body providing electrical isolation of said zones in said body, the crystallographic orientation of said body and the impurity concentration and conductivity-type of the respective low resistivity zones formed therein being selected to provide said low resistivity zones with longitudinal elastoresistance coefficients which are large and of one polarity; and means for making electrical connections to appropriate end portions of oppositely disposed low resistivity zones to form a complete bridge circuit wherein one resistance arm of each current path thereof is disposed on one face of said body and the other resistance arm of each current path is disposed on the opposite face thereof.

References Cited by the Examiner

UNITED STATES PATENTS

| | | | |
|---|---|---|---|
| 2,400,467 | 5/1946 | Ruge | 73—398 |
| 2,474,988 | 7/1949 | Sargroue | 29—155 |
| 2,507,501 | 5/1950 | Clark | 73—398 |
| 2,701,326 | 2/1955 | Pfann et al. | 317—235 |
| 2,939,317 | 6/1960 | Mason | 73—134 |
| 2,979,807 | 4/1961 | Harrison | 29—155.62 |
| 2,991,542 | 7/1961 | Edwards | 29—155.62 |
| 3,034,345 | 5/1962 | Mason | 73—141 |
| 3,049,685 | 8/1962 | Wright | 73—88.5 |

OTHER REFERENCES

J. C. Sanchez: "Semiconductor Strain Gages: A State of the Art," Strain Gage Readings, vol. IV, No. 4, October-November 1961, pp. 3 to 16 (page 6 relied upon).

Pfann et al.: "Semiconducting Stress Transducers Utilizing the Transverse and Shear Piezoresistance Effects," Journal of Applied Physics, vol. 32, No. 10, October 1961, pp. 2008–2019.

RICHARD C. QUEISSER, *Primary Examiner.*

C. A. RUEHL, *Assistant Examiner.*